(12) United States Patent
Shreesha et al.

(10) Patent No.: US 8,938,519 B1
(45) Date of Patent: *Jan. 20, 2015

(54) DEVICE CONFIGURATION

(71) Applicant: Marvell International Ltd., Hamilton (BM)

(72) Inventors: Vasanth Shreesha, Bangalore (IN); Sarma V. Kolluru, San Ramon, CA (US); Vasudev Bhaskaran, Sunnyvale, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,800

(22) Filed: Apr. 29, 2013

Related U.S. Application Data

(63) Continuation of application No. 12/417,187, filed on Apr. 2, 2009, now Pat. No. 8,433,778.

(60) Provisional application No. 61/046,915, filed on Apr. 22, 2008.

(51) Int. Cl.
*G06F 15/16* (2006.01)
*H04N 5/44* (2011.01)

(52) U.S. Cl.
CPC .................................. *H04N 5/4403* (2013.01)

USPC ............................ 709/218; 709/219; 709/220

(58) Field of Classification Search
USPC .......................................... 709/218, 219, 220
See application file for complete search history.

(56) References Cited

U.S. PATENT DOCUMENTS 7,428,023 B2 9/2008 Allen et al.
2006/0187195 A1 8/2006 Chung

*Primary Examiner* — Adnan Mirza

(57) ABSTRACT

Devices, systems, methods, and other embodiments associated with configuring devices are described. In one embodiment, a method includes receiving, from a remote device, a search input for an adjustment parameter. The method searches for the adjustment parameter in a television device based, at least in part, on the search input, wherein the adjustment parameter is a setting in the television device that controls how content is displayed. After the adjustment parameter is found, the adjustment parameter is returned to the remote device, which is caused to display the adjustment parameter. An input parameter value for changing the adjustment parameter is received from the remote device. The television device is reconfigured by locally changing the adjustment parameter based at least in part on the input parameter value, wherein a content is displayed on the television device based on at least the changed adjustment parameter.

21 Claims, 13 Drawing Sheets

DEVICE CONFIGURATION

CROSS REFERENCE TO RELATED APPLICATIONS

This disclosure is a continuation of U.S. application Ser. No. 12/417,187 filed on Apr. 2, 2009, now U.S. Pat. No. 8,433,778, which claims benefit under 35 USC §119(e) to U.S. provisional application Ser. No. 61/046,915 filed on Apr. 22, 2008, which are both hereby wholly incorporated by reference.

BACKGROUND

Electronic devices may be configurable by a user. The user may begin to configure the device by displaying a configuration menu. The configuration menu may be displayed on a device display. After displaying the configuration menu, the user may still need to descend through several submenus before reaching a parameter the user desires to configure.

For example, a user may desire to change the contrast setting on a television (TV). The user may press a "menu" button on a TV remote control. The TV will then display a menu. The menu will display various categories of TV parameters that may be changed. The user will then need to select one of a category of parameters corresponding to contrast. A display category may be selected that may correspond to the contrast parameter. If there are many display parameters, the user may need to descend into subgroups of parameters before reaching a control menu for changing the contrast. This method of configuring a television requires the user to understand the organization of related parameters in a menu system. The menu system may have multiple layers of menu screens. The user may not find the menu for a specific TV parameter if the user does not understand the organization well. Additionally, when a configuration menu is displayed on the TV screen the menu obscures television content (e.g. the TV show) being viewed by the user or other TV viewers.

Some electronic devices need to be configured after they are purchased from a store. The purchaser may purchase the device, tear open the packaging, and set up the device at the purchaser's home. The purchaser may need to configure several parameters that the purchaser has no prior experience in configuring. The purchaser might select parameter settings that are in conflict with other parameter settings. If the electronic device is not correctly configured, the electronic device may not function properly. The purchaser of the device may think that an unbroken electronic device is broken when the device does not function properly because of improper configuration. The purchaser will return the device that does not function properly to the store of purchase when the device is believed to be broken, even though the device is not broken. A more effective way of configuring electronic devices may be desired.

SUMMARY

In one embodiment, a method includes receiving, from a remote device, a search input for an adjustment parameter. The method searches for the adjustment parameter in a television device based, at least in part, on the search input, wherein the adjustment parameter is a setting in the television device that controls how content is displayed. After the adjustment parameter is found, the adjustment parameter is returned to the remote device, which is caused to display the adjustment parameter. An input parameter value for changing the adjustment parameter is received from the remote device. The television device is reconfigured by locally changing the adjustment parameter based at least in part on the input parameter value, wherein a content is displayed on the television device based on at least the changed adjustment parameter.

In another embodiment, an apparatus comprises interface logic configured to wirelessly communicate with a remote device and configured to receive, from the remote device, (i) a search input for an adjustment parameter and (ii) an input parameter value for changing the adjustment parameter. A search engine configured to search for the adjustment parameter in a television device based, at least in part, on the search input, wherein the adjustment parameter is a setting in the television device that controls how content is displayed by the television device. The search engine is configured to return the adjustment parameter to the remote device after the adjustment parameter is found, and cause the remote device to display the adjustment parameter. Control logic is configured to reconfigure the television device by changing the adjustment parameter based at least in part on the input parameter value, wherein a content is displayed on the television device based on at least the changed adjustment parameter.

In another embodiment, a chip comprises an interface configured to wirelessly communicate with a remote device. A search engine is configured to search for the adjustment parameter in a television device based, at least in part, on a search input received from the remote device, wherein the adjustment parameter is a setting in the display device that controls how content is displayed by the display device. The search does not include searching a program guide for selecting a show to watch or record. The search engine is configured to return the adjustment parameter to the remote device after the adjustment parameter is found, and cause the remote device to display the adjustment parameter. Control logic is configured to reconfigure the display device by changing the adjustment parameter in the display device based at least in part on an input parameter value received from the remote device, wherein a content is displayed on the display device based on at least the changed adjustment parameter.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
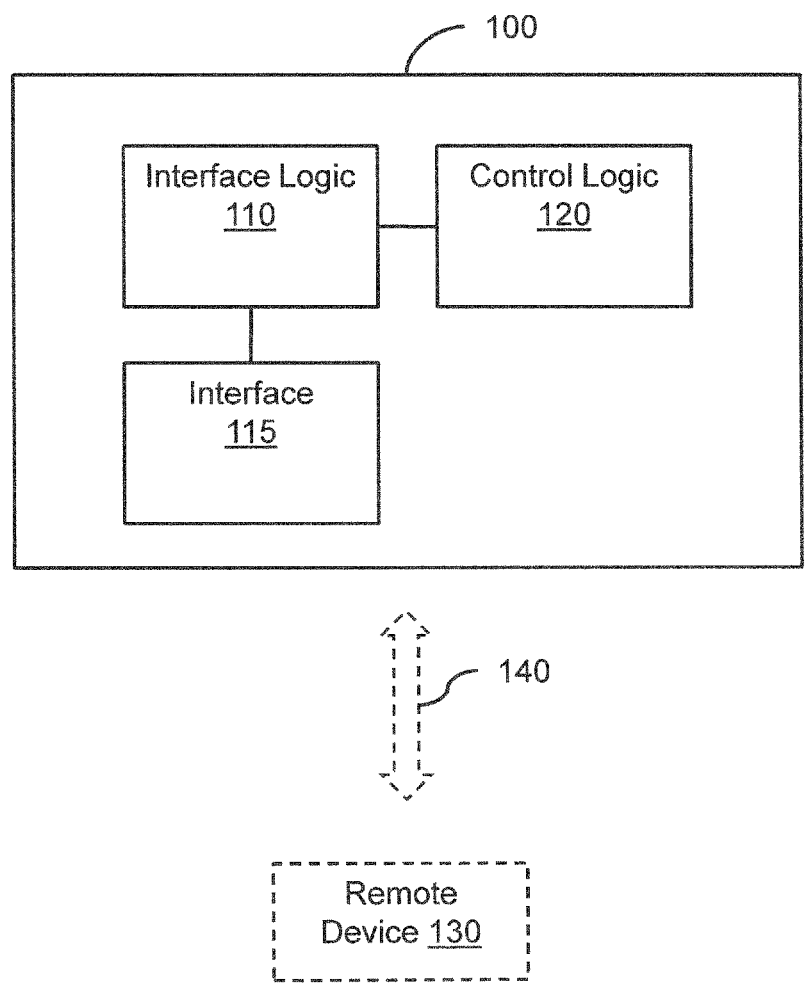
FIG. 1 illustrates one embodiment of an apparatus associated with device configuration.

Described herein are example systems, methods, and other embodiments associated with device configuration. The device to be configured may be an electronic device that displays images (e.g. a television). In one embodiment, an apparatus is provided that displays a search menu on a TV that allows a TV user to enter a portion of a TV parameter that the user desires to change. The apparatus will search for TV parameters that correspond to the portion of the TV parameter entered and display the results. The apparatus will adjust a TV parameter based on a TV parameter selected from the displayed results and a corresponding setting value selected by the TV user. A TV parameter as used herein is an internal/local TV setting for how the television displays content (e.g., brightness, contrast, and so on) and is not a channel/program setting for changing the content itself where content is a TV show or broadcast/streamed program that is watched on the TV.

In one embodiment, a chip may provide an interface to configure the TV. The chip may be located in the TV. In another embodiment, the chip may be located in a set top box connected to the TV. The chip may search for and locate a remote device (e.g., a cellular phone) in the vicinity of the TV using wireless communications. The chip may provide the cellular phone with an interface and TV parameters that are configurable. Thus in one embodiment, the chip converts a non-TV remote control to be a TV remote control capable of controlling settings on the TV. Using the interface and display of the cellular phone, a user may select a TV parameter to configure. The selections are transmitted to the chip and the chip may then respond to the selections and reconfigure the TV. Since the display of the cellular phone is used to present a menu and interface, the TV can be reconfigured without obscuring the content being played on the TV screen (e.g. without displaying a menu on the TV). Communications to the TV user are displayed on the cellular phone and thus in one embodiment, the communications and menu can be implemented to not alter the TV screen. The TV screen is altered, if at all, at the time of applying a selected configuration value that affects the TV screen. For example, changing a picture contrast value alters the picture when the new value is applied to the display.

In one embodiment, an image device may be configured by a chip controlling a remote device. The remote device may be a cellular phone. A chip in the image device comprises an interface logic to provide configuration information to the remote device. The configuration information is associated with controlling the image device. The interface logic causes the remote device to display a graphical user interface (GUI). The GUI presents the configuration information to the remote device user. Thus while the GUI is displayed and operated on the remote device, images displayed on the image device while the user is configuring the image device maybe unaltered and un-obscured by the GUI menus on the remote device. The chip comprises a control logic to control the image device, based, at least in part, on an input accepted by the remote device.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, a non-transitory computer-readable medium with stored instructions, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

FIG. 1 illustrates one embodiment of an apparatus 100 associated with device configuration. In one embodiment, the apparatus 100 may be implemented in a chip. The chip may be a set of micro-miniaturized electronic circuits fabricated on semiconductor material. In one embodiment, the apparatus 100 comprises an interface logic 110 to detect a remote device 130, and transmit an interface 115 to the remote device that converts the remote device to be a remote control device for providing selected configuration information for controlling an image device. Control logic 120 is configured to provide control signals for reconfiguring the image device based, at least in part, on the selected configuration information received from the remote device. It will be appreciated that the remote device 130 is not part of the apparatus 100, and that the detection and communication may be performed by wireless communication 140. The wireless communication may be uni-directional or a bi-directional communication.

The apparatus 100 may allow an electronic device to be configured. In one embodiment, the apparatus 100 may be implemented in a television (TV). In one embodiment, the apparatus 100 may transmit the interface 115 to a non-TV remote control device (e.g. a cellular phone) that provides functions to the cellular phone to communicate with the apparatus and configure television settings. Thus the cellular phone is converted to be a TV remote control that uses its display for menu interactions with the TV display, (e.g., displaying search results). In one embodiment, the apparatus 100 can dynamically detect the presence of wireless remote devices (e.g. in the room of the apparatus), establish communication, and dynamically transmit the configuration information/interface features that allow the remote device to operate as a remote control to configure the image device.

It will be appreciated that in addition to a cellular phone, the remote device may be a personal digital assistant (PDA), a Blackberry, a portable media player, a computer, and so on. In addition to a TV, the electronic device may be projector, a digital video disk (DVD) player, a video home system (VHS) player, other type of image displaying device, and so on. The list of electronic devices and remote devices is not all inclusive. A person of ordinary skill in the art will realize that the remote device and the electronic device may be devices other than those listed above.

With further reference to FIG. 1, in another embodiment, the interface logic 110 is configured to provide configuration information to the remote device 140 (e.g., cellular telephone), which will provide remote controller features to the remote device. The configuration information is associated with configuring the image device and includes executable code and/or a graphical user interface (GUI). In one embodiment, the GUI provides a search menu for receiving search terms from a user operating the remote device 130. The search terms can be for searching configuration parameters that are available on the image device.

In one embodiment, the interface logic 110 causes the remote device 130 to display a GUI on its display to present the configuration information. Using the display of the remote device for the GUI avoids a GUI or menu being displayed on the image device. Thus the images displayed on the image device (e.g. TV broadcast) may be unaltered and un-obscured while the user is attempting to change configuration settings.

In one embodiment, the configuration information provided to the remote device by the interface logic 110 may include a list of parameters that can modify display settings for the image device. The parameter list may be presented on the remote device GUI. In one embodiment, meta tags may be associated with the parameters. The meta tags allow the common names of parameters to be displayed with the list of parameters to provide more parameter choices for users that are not familiar with some parameter names. The input may be a parameter selected by a user of the remote device. The control logic 120 controls the image device, based, at least in part, on an input accepted by the remote device. For example the remote device may accept an input to change the contrast of a TV. The control logic 120 may then change the contrast according to the value specified by the input.

Figure 2:
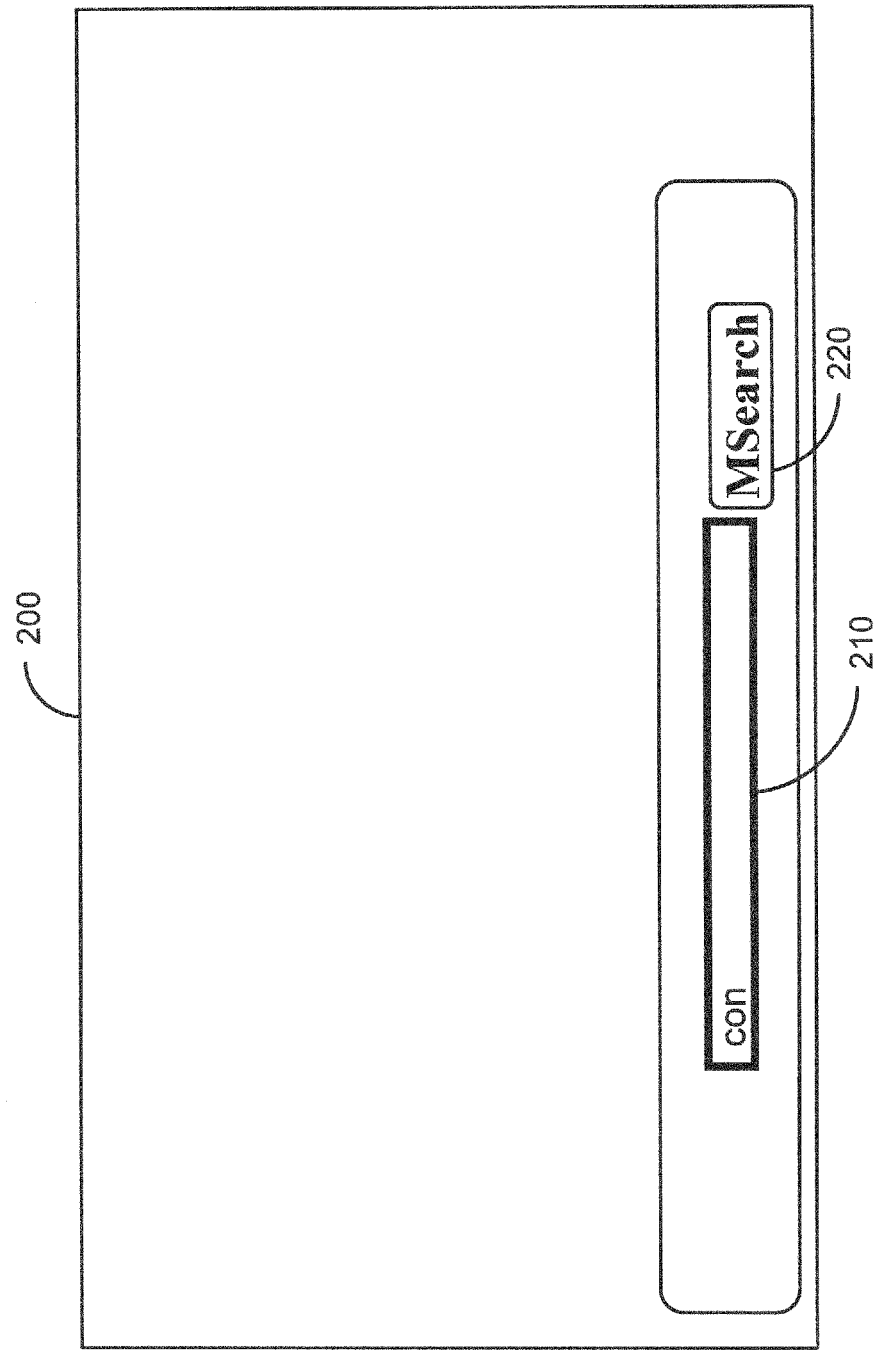
FIG. 2 illustrates one embodiment of a screen shot associated with device configuration.

In another embodiment, the apparatus 100 may cause the cellular phone to display a GUI input screen 200 similar to that shown in FIG. 2. A user may not know the name of a parameter needed to set a specific configuration. The input screen 200 allows a user to enter part of a parameter name in the window 210. The user may enter a whole string or a portion of a string. The string may be part of a parameter name. In one embodiment, the input string is transferred to the apparatus 100 through the interface logic 110 when a search button 220 on the screen 200 is pressed.

Figure 3:
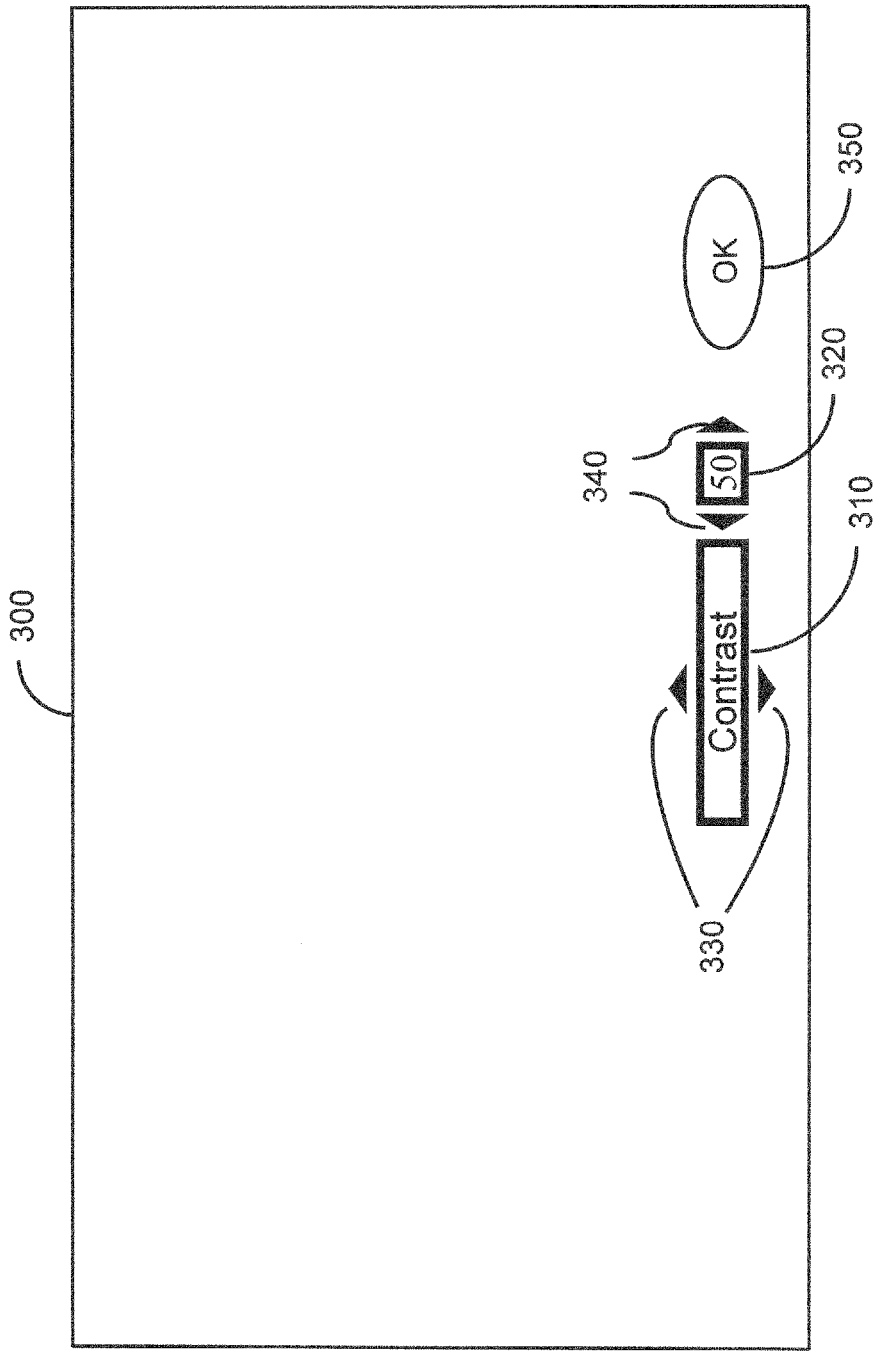
FIG. 3 illustrates another embodiment of a screen shot associated with device configuration.

The apparatus 100 may perform a search for parameters of a device based on the input string. For example, if the input string is "contrast", the apparatus 100 may determine that the parameters of contrast, backlight, and sharpness are related. The apparatus 100 may return the related parameters to the cellular phone and cause the cellular phone to display the parameters with the GUI. The cellular phone may display the parameter screen 300 shown in FIG. 3. The parameter of contrast is displayed in the parameter box 310 and the current contrast value is displayed in the value box 320.

A cellular phone user may then use the scroll up and down arrows 330 to scroll through the related parameters of contrast, backlight, and sharpness. The user will display the parameter the user desires to change in the parameter box 310. In some embodiments, one parameter is displayed at a time in the parameter box 310. The user may then use the left and right arrows 340 of the value box 320 to select a parameter value. The user may specify the new value has been entered by hitting an enter button on the cellular phone or by clicking an "OK" button 350 on the parameter screen 300. The user may also press a "Cancel" button on the remote device to undo changes, to not accept changes, or to go back to the a previous menu, screen, or state. Using a cellular phone to enter a parameter value does not interfere with the TV display because no menus may be displayed on the TV and no scrolling may be performed on the TV display. The apparatus 100 may then retrieve the selected parameter value. The control logic 120 controls the TV based on the selected parameter value. In one embodiment, the control logic 120 is configured to control the image device by sending data based on the selected parameter value to an API in the TV.

Figure 4:
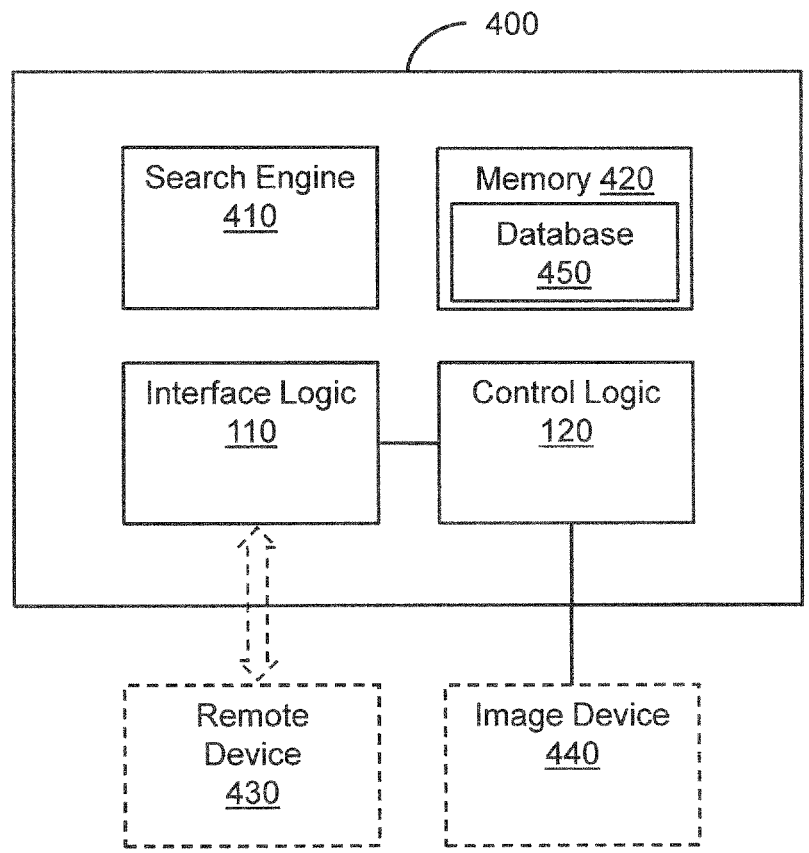
FIG. 4 illustrates another embodiment of an apparatus associated with device configuration.

FIG. 4 illustrates another embodiment apparatus 100 is shown as apparatus 400 associated with device configuration. The interface logic 110 and the control logic 120 as shown in FIG. 1 are used in apparatus 400. The apparatus 400 also comprises a search engine 410 and a memory 420. The interface logic 110 and the control logic 120 may operate as described above. The apparatus 400 may interface a remote device 430 and an image device 440 as discussed above. In some embodiments, the interface logic 110 may search for and detect the remote device 430 as well as other devices. This allows the apparatus to find new devices when new devices become available. For example, a user may upgrade to a new cellular phone. The apparatus 400 will detect the new cellular phone, transfer the interfacing features to the new phone, and allow the user to interface the TV with the new cellular phone. The interface logic 110 may authenticate the remote device 430 prior to transferring the configuration information to the remote device 430. The interface logic 110 may conduct a Bluetooth® search.

In one embodiment, the search engine 410 is configured to search for the configuration information. The search is based on a search request from the remote device 430. The interface logic 110 is configured to receive the search request from the remote device 430 (e.g., cellular phone). In one embodiment, the memory 420 may contain the configuration information. The memory 420 may be searched by the search engine 410. The memory 420 may be a flash memory containing the configuration information. The configuration information may be in a database 450 in the memory 420. In one embodiment, the configuration information is for configuration parameters in a television. The interface logic 110 is configured to communicate the configuration information to the remote device 430. The remote device may be a cellular phone. The interface logic 110 may communicate the configuration information to the remote device 430 over a wireless communication channel, for example, a Bluetooth® link. Of course other types of wired or wireless protocols may be used.

In one embodiment, the interface logic 110 detects a remote device 430. The remote device may be a cellular phone. The interface logic 110 may provide the cellular phone configuration information associated with configuring the image device 440. The interface logic 110 causes the cellular phone to display the GUI to present the configuration information.

In another embodiment, the interface logic 110 is configured to download/transmit an applet to the remote device 130. The applet is configured to control the presentation of the GUI. The configuration information may be based on information in an Electronic Program Guide (EPG) database. The EPG configuration information may be communicated via a network on a program, channel, or time basis.

The control logic 120 may control different kinds of electronic device parameters also referred to herein as display device settings. For example, the control logic 120 may control parameters that affect a TV display or the sound system of the TV. A partial list of the parameters the control logic 120 may control for a TV comprises brightness, contrast, backlight, sharpness, colors, resolution, tint, picture positioning, channel mapping, power, H. position, V. position, tuning, aspect ratio, text/graphic mode, color temperature, sound, volume, balance, bass, treble, surround sound, caption, parental controls, change password, V-chip temporary disable, setup menu timeout, auto scan, channel delete, language, favorite, memory recall, channel labels, picture in picture settings, analog channel tuning, digital noise reduction, low noise amplifier, sleep timer, on/off time, energy saving features, film mode, game mode, R offset, R gain, G offset, G gain, B offset, B gain, and dynamic contrast. A person of ordinary skill in the art will recognize that this list is a partial list of parameters and that other parameters and different types of electronic device parameters may be controlled by the control logic 120. In some embodiments, the parameters may be software configurable.

Figure 5:
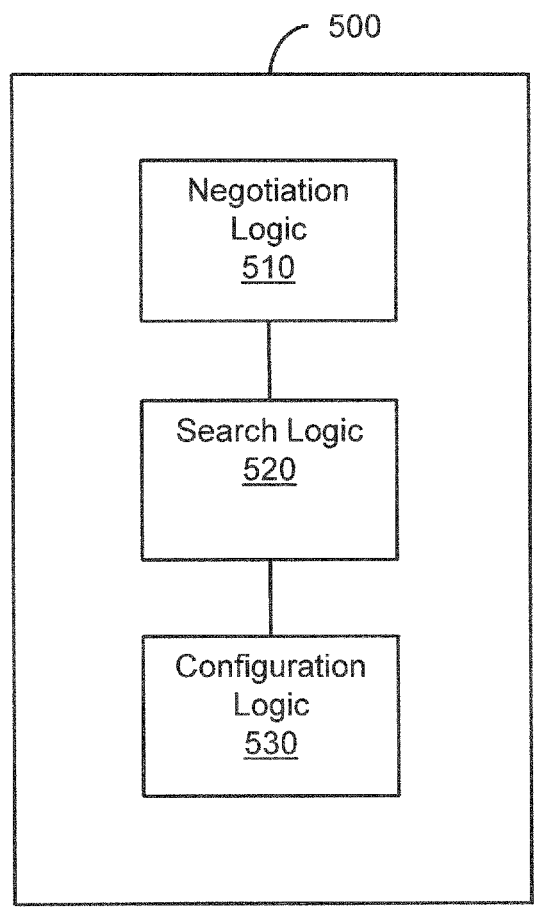
FIG. 5 illustrates another embodiment of an apparatus associated with device configuration.

FIG. 5 illustrates another embodiment of an apparatus 500 associated with device configuration. The apparatus 500 is comprised of a negotiation logic 510, a search logic 520, and a configuration logic 530. The negotiation logic 510 may operate as the interface logic 110 described above. The configuration logic 530 applies configuration parameters to a display device similar to the control logic 120 discussed above.

The negotiation logic 510 negotiates with a remote device to establish the remote device as a slave to the apparatus 500. The remote device may be a cellular phone. The negotiation logic 510 is configured to provide a search menu to the slave. The search menu is configured to receive an input to be searched.

The search logic 520 is configured to search for and to retrieve parameters for configuring the display device. The search logic 520 is configured to search for one or more parameters based on the input. If the image device is a TV, the parameters searched for would be parameters to control the TV. The search logic 520 is configured to provide one or more parameters to the slave.

The configuration logic 530 is configured to configure the display device. The display device is configured based on an input parameter value. The one or more parameters may be displayed by the slave in a GUI of the slave. The input value is accepted by the slave in response to the one or more parameters displayed in the GUI.

A content is displayed on the display device. If the display device is a TV, the content would be displayed on the TV screen. The content may be unaltered and un-obscured by the search menu. The search menu on a cell phone may not alter or interfere with a TV screen image.

For example, a TV viewer may be watching a concert with some friends. The user may desire to increase the volume without obscuring the display of the performance on the TV. The apparatus 500 allows the user to change the TV volume without obscuring or altering the display of the performance because the apparatus 500 may use a cellular phone GUI to configure the TV.

Figure 6:
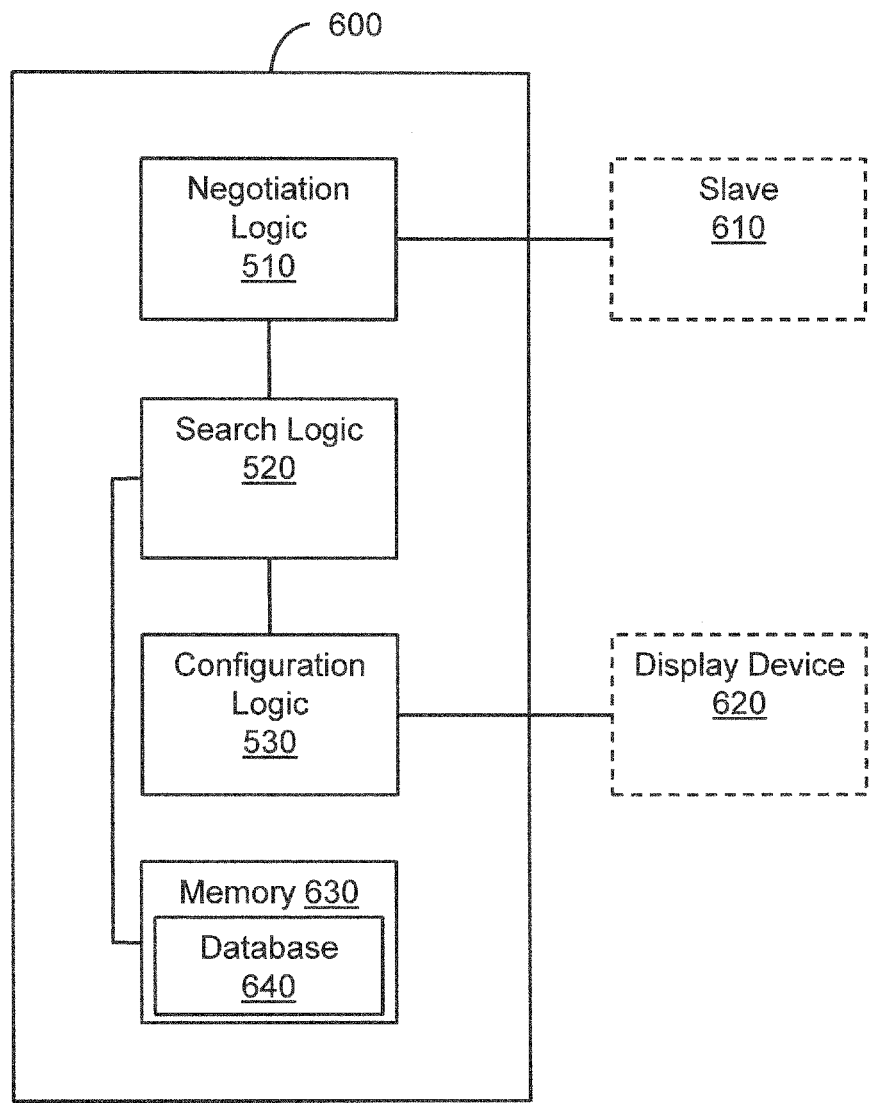
FIG. 6 illustrates another embodiment of an apparatus associated with device configuration.

FIG. 6 illustrates another embodiment of an apparatus 600 associated with device configuration. The apparatus 600 may be implemented in a chip within a TV. The apparatus 600 is comprised of a negotiation logic 510, a search logic 520, and a configuration logic 530 that operate as describe above with reference to FIG. 5. The negotiation logic 510 is configured to negotiate with a remote device to establish the remote device as a slave 610 to the apparatus 600. The configuration logic 530 may configure a display device 620 as described above with reference to FIG. 5. The apparatus 600 comprises a memory 630. The memory 630 may be a flash memory that stores the parameters used to configure the display device 620. The flash memory may be a persistent storage. Each parameter may have an identification (ID). The parameters may be stored in the flash memory based on the ID. For example, contrast may be one ID value and tint may be another ID value. The ID may be a tag that points to where parameter variables are stored. The IDs may be independent of language.

In one embodiment, the memory 630 comprises a database 640. The search logic 520 is configured to search the database 640 for the one or more parameters. The database 640 may comprise one or more linked lists of related parameters. The one or more parameters searched for by the search logic 520 are stored in the one or more linked lists.

In one embodiment, the input received by the search menu on the GUI of the remote device is a portion of a string of characters. The search logic 520 is configured to match the portion of the string of characters to the one or more parameters. For example, if the TV user entered "cont" into the remote device, then the search logic 520 would search for TV parameters containing "cont". The search logic 520 may find the parameter for changing contrast. The contrast parameter may be in a linked list that contains a parameter for background light and a parameter for picture sharpness. The negotiation logic 510 may have these parameters displayed on a cellular phone GUI as discussed above with reference to FIG. 1. The display device user may then select one of the displayed parameters. The configuration logic 530 is configured to then configure the display device 620.

In one embodiment, the negotiation logic 510 is configured to search for a remote device. The remote device may be a cellular phone. The negotiation logic 510 is configured to provide a search menu to the cellular phone. The search logic 520 is configured to provide the one or more parameters to the cellular phone. The database 640 is searched for the one or more parameters by the search logic 520. The search logic 520 may search an EPG database or other databases and/or programs. The EPG database or other databases and/or programs may be in the apparatus 600 or in a network connected to the apparatus 600. The EPG may be searched by program start time, program name, or channel. A person of ordinary skill in the art will recognize that the EPG may be searched by other parameters.

In one embodiment the negotiation logic 510 is configured to establish a communication link with a second remote device. The negotiation logic 510 may conduct a Bluetooth® search. If the second remote device is found, a Bluetooth® link may be established with the second remote device. The search logic 520 is configured to search the second remote device for the one or more parameters. In one embodiment, a Blu-ray device may be the second remote device. The proper bi-directional interface may need to be available before the second remote device may be searched. Searching a second remote device may reduce or eliminate the need to navigate between screens for searching content.

In some embodiments, the apparatus 600 may determine the skill level of a user of the display device 620. The negotiation logic 510 is configured to request that the slave 610 determine a user skill level. The user skill level may be based on the proficiency of the user in using the display device 620. In another embodiment, the skill level may be determined through handshaking during an initialization phase. The search logic 520 is configured to search for one or more parameters based on the input and the user skill level. For example, a user may input a request into the GUI to search for "contrast". Six parameters related to contrast may be returned by the search logic 520 when the user has an expert skill level. The six parameters may include parameters for advanced features that a novice user is not permitted to adjust. Two parameters may be returned by the search logic 520 when the user has a novice skill level.

In one embodiment, the configuration logic 530 is configured to control the display device 620 by sending data based on the input parameter value to an API to control the display device 620. Parameters/imaging settings that may be controlled are brightness, contrast, backlight, sharpness, colors, resolution, tint, and so on. A person of ordinary skill in the art will recognize that this list is a partial list of parameters that the configuration logic 530 may control. The configuration logic 530 may control other device parameters.

Figure 7:
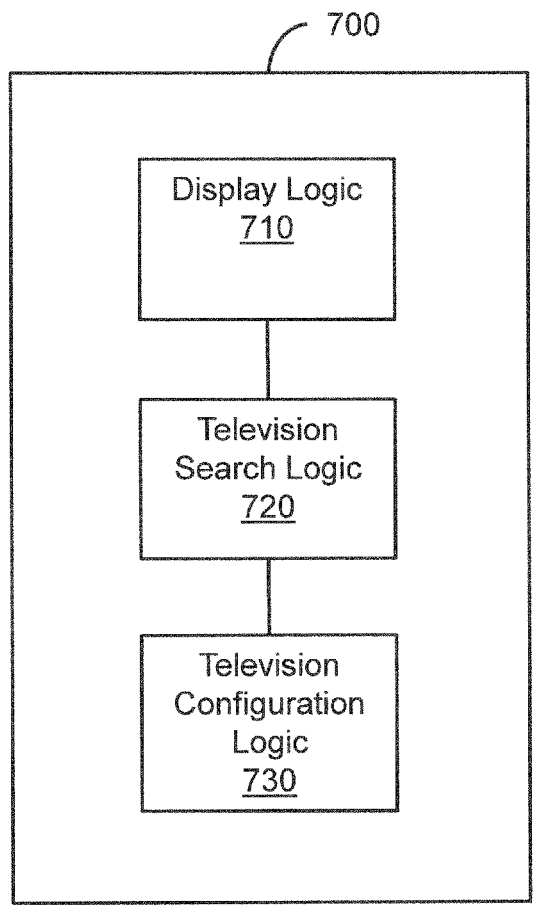
FIG. 7 illustrates another embodiment of an apparatus associated with device configuration.

FIG. 7 illustrates an embodiment of a chip with a search engine 700 associated with device configuration. In one embodiment, the chip is implemented with at least one or more integrated circuits. The chip with a search engine 700 is comprised of a display logic 710, a television search logic 720, and a television configuration logic 730. The display logic 710 is configured to display a television control menu on a television screen of a television. The television control menu is configured to accept a search input. In one embodiment, the display logic is configured to accept the search input from a cellular telephone.

The television search logic 720 is configured to search for television adjustment parameters based on the search input. The television adjustment parameters are television parameters that a user of the television may change, which are settings for how the television displays content and are not for changing the content itself (e.g., content is a TV show or broadcast/streamed program that is watched). The television adjustment parameters that the television search logic 720 returns are a set of related parameters. The television search logic 720 is configured to provide the television adjustment parameters to the television control menu. In one embodiment, the search input includes a user skill level, and the television search engine 720 is configured to search for the at least one parameter based on the selected configuration information and the user skill level. The television control menu is configured to accept an input parameter value based on the television adjustment parameters. The input parameter value is the television adjustment parameter the user desires to change. The television control logic 730 is configured to control the television, based, at least in part, on the input parameter value.

In one embodiment, the chip with a search engine 700 accepts adjustment parameters that control display settings of at least brightness and/or contrast, and the television control logic adjusts the television based, at least in part on those parameters. Thus the control logic is configured to use the adjustment parameters to change internal/local display settings in the television that affect how content is displayed (e.g., brightness, contrast, etc). The content refers to an actual TV show or broadcast/streamed program. When the TV adjustment parameter changes, the same content (the TV program) is still displayed but the content is displayed differently (e.g., displayed with different brightness, contrast, colors, etc.). As such, changing the television adjustment parameters does not refer to or involve searching content/program guides in order to select a show to watch or record.

Example methods may be better appreciated with reference to flow diagrams. While for purposes of simplicity of explanation, the illustrated methodologies are shown and described as a series of blocks, it is configured to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
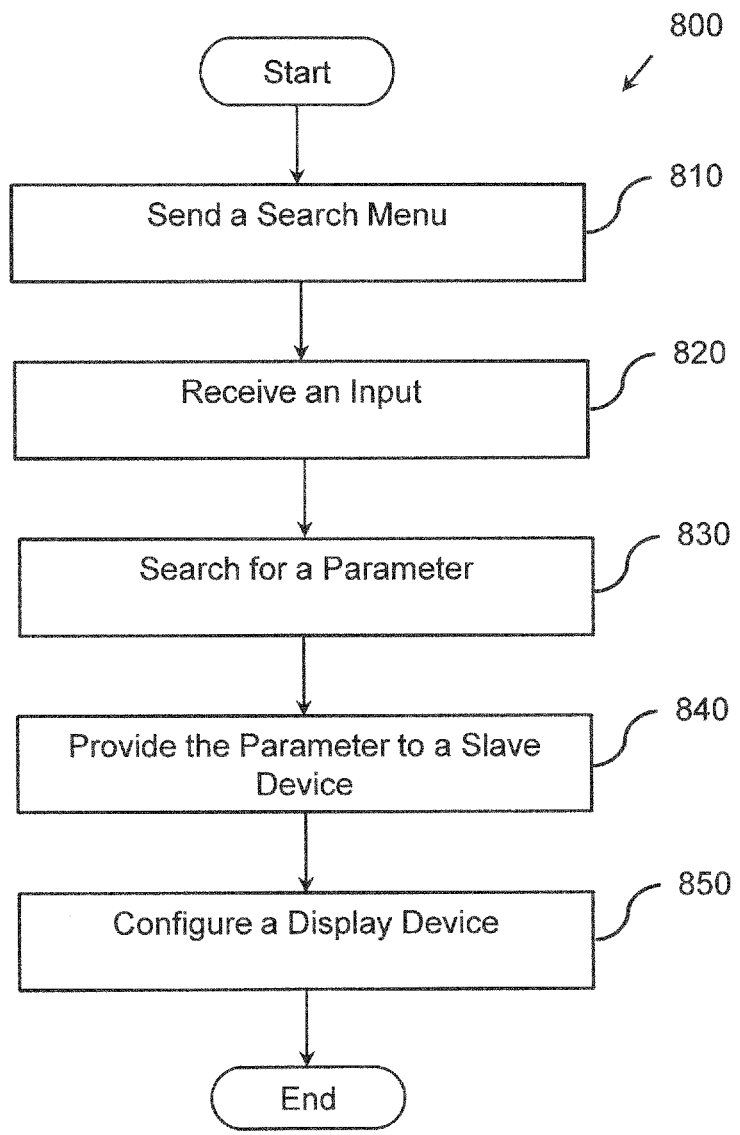
FIG. 8 illustrates an embodiment of a method associated with device configuration.

FIG. 8 illustrates an example method 800 associated with device configuration. The method 800 sends, at 810, a search menu to a slave device. The slave device may be cellular phone or another electronic device such as a hand held device. The user of a television may desire to change a television parameter but be unsure what the parameter is called. The user may type a search term into a search menu input area. The search menu receives the input to be searched from the search menu at 820.

A search for one or more parameters based on the input is made at 830. The one or more parameters are for configuring a display device. The one or more parameters correspond to the search input. The search may be a database search and may include related data in a linked list as discussed above.

The one or more parameters are provided, at 840, the to the slave device. The slave device is configured to accept an input parameter value based on the one or more parameters.

The display device is configured, at 850, based on the input parameter value. A content is displayed on the display device. The display device may be the television. The content may be un-obscured and unaltered by the search menu because the search menu is not on the display device.

Figure 9:
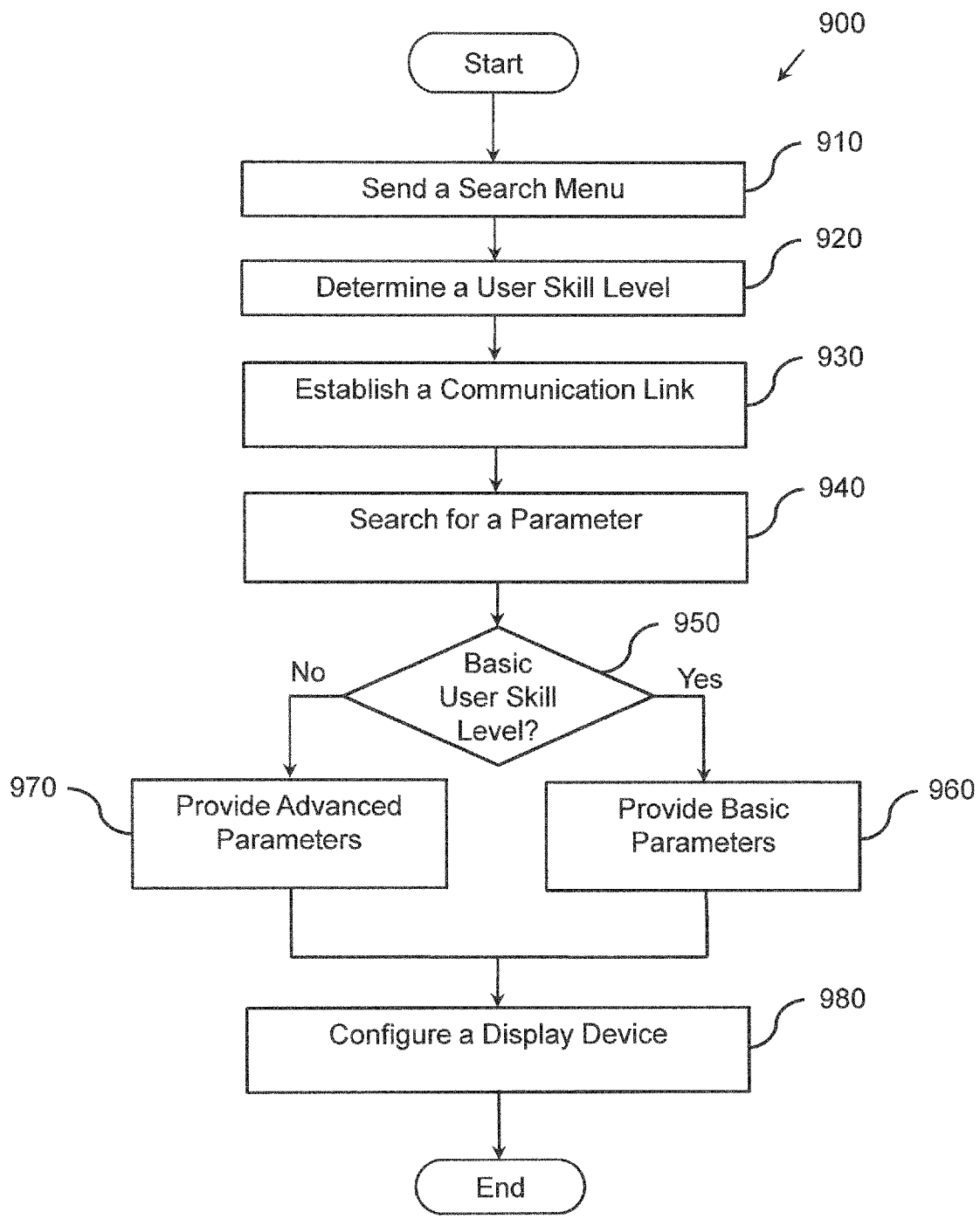
FIG. 9 illustrates another embodiment of a method associated with device configuration.

FIG. 9 illustrates an example method 900 associated with device configuration. The method 900 may be performed in a chip. The chip may be in a television. The method 900 comprises sending, at 910, a search menu. The search menu may be sent to a slave device. A slave device may be a cellular phone or another display device such as a hand held device. The cellular phone user may desire to change an electronic device parameter such as a television parameter. The user may enter a search term into the search menu. The search term is an input associated with the television parameter.

The user skill level is determined at 920. The user skill level may be a basic level or an advanced level. The method 900 establishes, at 930, a communication link with a second remote device. The second remote device may be an electronic device as discussed above. The second remote device is searched, at 940 for one or more parameters based on the search term input. The searching may also be based on the user skill level. The searching may comprise searching a database of linked lists of related parameters. The one or more parameters may be retrievable from the linked list.

A determination is made, at 950, to determine if the user skill level is a basic skill level. The method 900 may provide, at 960, parameters from the search that contain fewer parameters than the advanced level when the skill level is the basic skill level. The method 900 may provide, at 970, parameters from the search that contain more parameters than the basic level when the skill level is the advanced skill level. The display device user may select one of the provided parameters. The method 900 configures, at 980, the display device with the selected parameter. The configuring, at 980, may comprise sending data based on the selected parameter to an API.

In one embodiment, a search term input is a string of characters entered by a user. The searching, at 940, matches the string of characters to the one or more parameters related to the search term input. The searching, at 940, may comprise searching information in an EPG database.

Examples of parameters that may be configured at 980 are various imaging settings comprising brightness, contrast, and others as previously described. These are examples and one of ordinary skill in the art will appreciate that other parameters may be configured at 980.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 10:
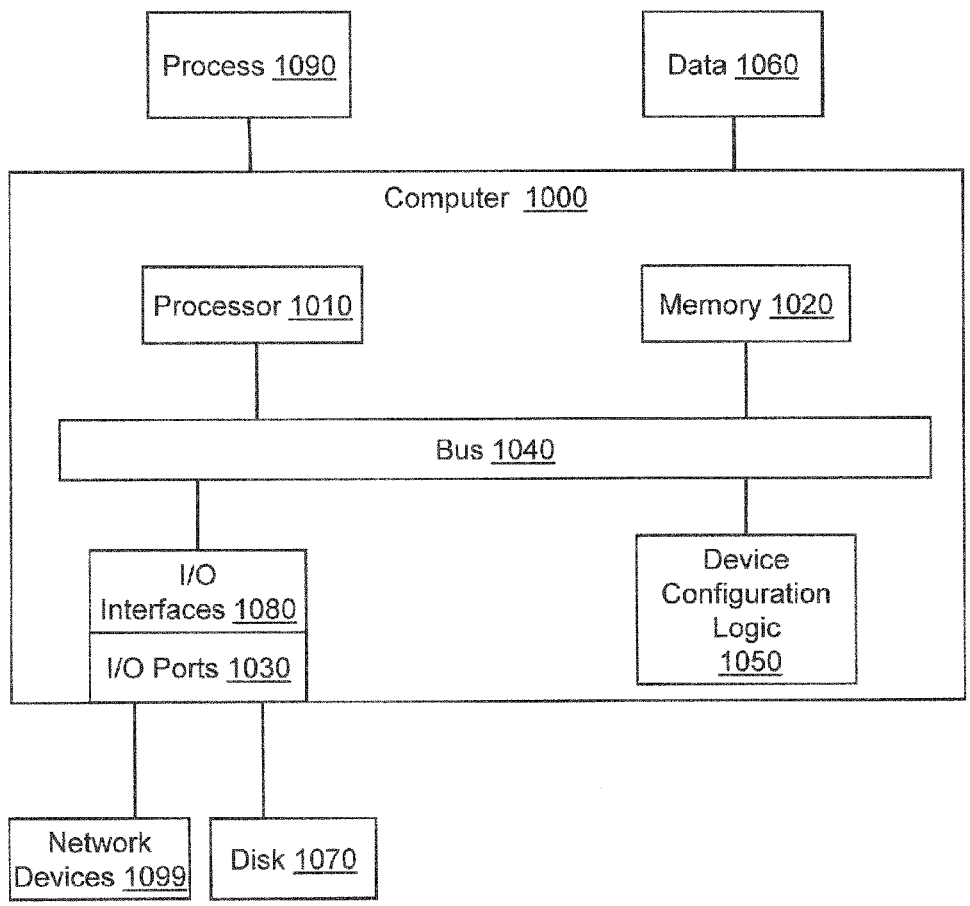
FIG. 10 illustrates one embodiment of a computing environment in which example systems and methods, and equivalents associated with device configuration may be implemented.

FIG. 10 illustrates an example computing device in which example systems and methods described herein, and equivalents, may be implemented. The example computing device may be a computer 1000 that includes a processor 1010, a memory 1020, and input/output ports 1030 operably connected by a bus 1040. In one example, the computer 1000 may include a device configuration logic 1050 to generate a device configuration.

The device configuration logic 1050 provides means (e.g., hardware, stored software, and firmware) for device configuration. The device configuration logic 1050 can be implemented similar to the apparatus 100, 400, 500, 600 or 700, and/or combinations of their features. The device configuration logic 1050 can include logic implemented, for example, as an ASIC or other type of circuit.

Generally describing an example configuration of the computer 1000, the processor 1010 may be a variety of various processors including dual microprocessor and other multi-processor architectures. A memory 1020 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 1070 may be operably connected to the computer 1000 via, for example, through an input/output interface (e.g., card, device) 1080 and the input/output port 1030. The disk 1070 may be, for example, a magnetic disk drive, a solid state disk drive, a floppy disk drive, a tape drive, a Zip drive, a flash memory card, a memory stick, and so on. Furthermore, the disk 1070 may be a compact disk read-only memory (CD-ROM) drive, a compact disk recordable (CD-R) drive, a compact disk rewritable (CD-RW) drive, a digital video disk read-only memory (DVD ROM), and so on. The memory 1020 can store a process 1090 and/or a data 1060, for example. The disk 1070 and/or the memory 1020 can store an operating system that controls and allocates resources of the computer 1000.

The bus 1040 may be an internal bus interconnect architecture and/or other bus or mesh architectures. While a single bus is illustrated, it is configured to be appreciated that the computer 1000 may communicate with various devices, logics, and peripherals using other busses (e.g., peripheral component interconnect express (PCIE), 1394, universal serial bus (USB), Ethernet). The bus 1040 can be types including, for example, a memory bus, a memory controller, a peripheral bus, an external bus, a crossbar switch, and/or a local bus.

The computer 1000 may interact with input/output devices via the input/output (I/O) interfaces 1080 including the device configuration logic 1050 and the input/output ports 1030. Input/output devices may be, for example, a keyboard, a microphone, a pointing and selection device, cameras, video cards, displays, the disk 1070, the network devices 1099, and so on. The input/output ports 1030 may include, for example, serial ports, parallel ports, and USB ports.

The computer 1000 can operate in a network environment and thus may be connected to the network devices 1099 via the I/O interfaces 1080, and/or the I/O ports 1030. Through the network devices 1099, the computer 1000 may interact with a network. Through the network, the computer 1000 may be logically connected to remote computers. Networks with which the computer 1000 may interact include, but are not limited to, a local area network (LAN), a wide local area network (WLAN), a wide area network (WAN), and other networks.

Figure 11:
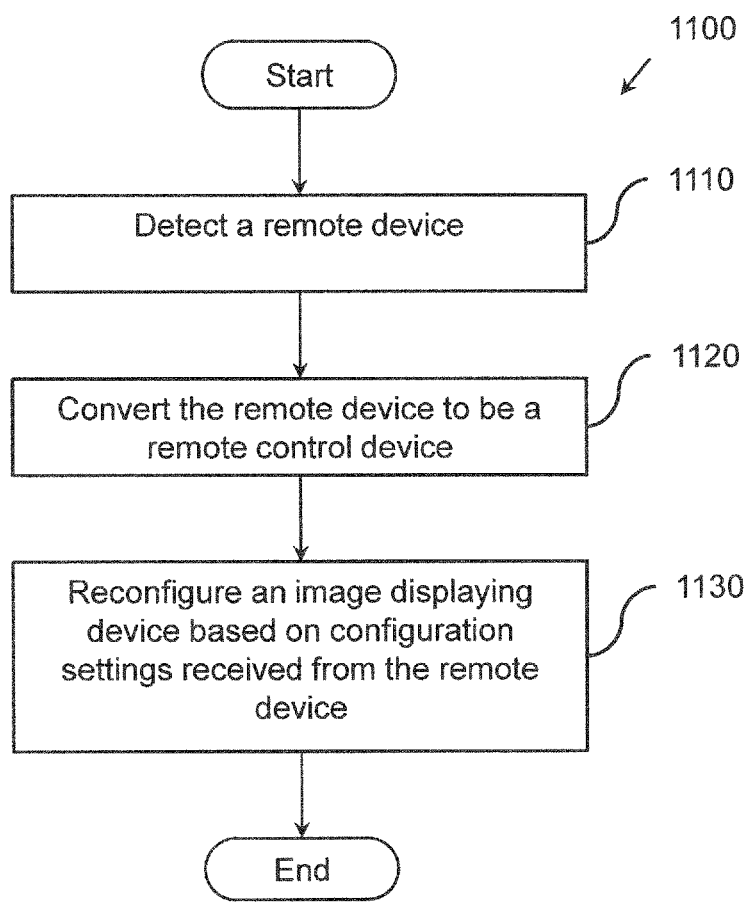
FIG. 11 illustrates one embodiment of a method associated with device configuration.
Figure 12:
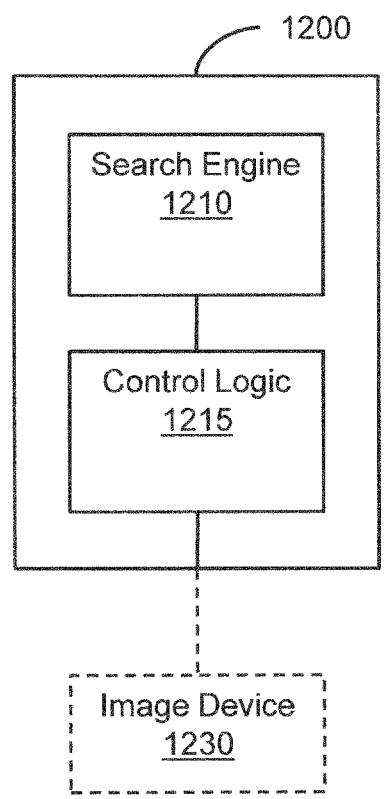
FIG. 12 illustrates one embodiment of an apparatus associate with device configuration.
Figure 13:
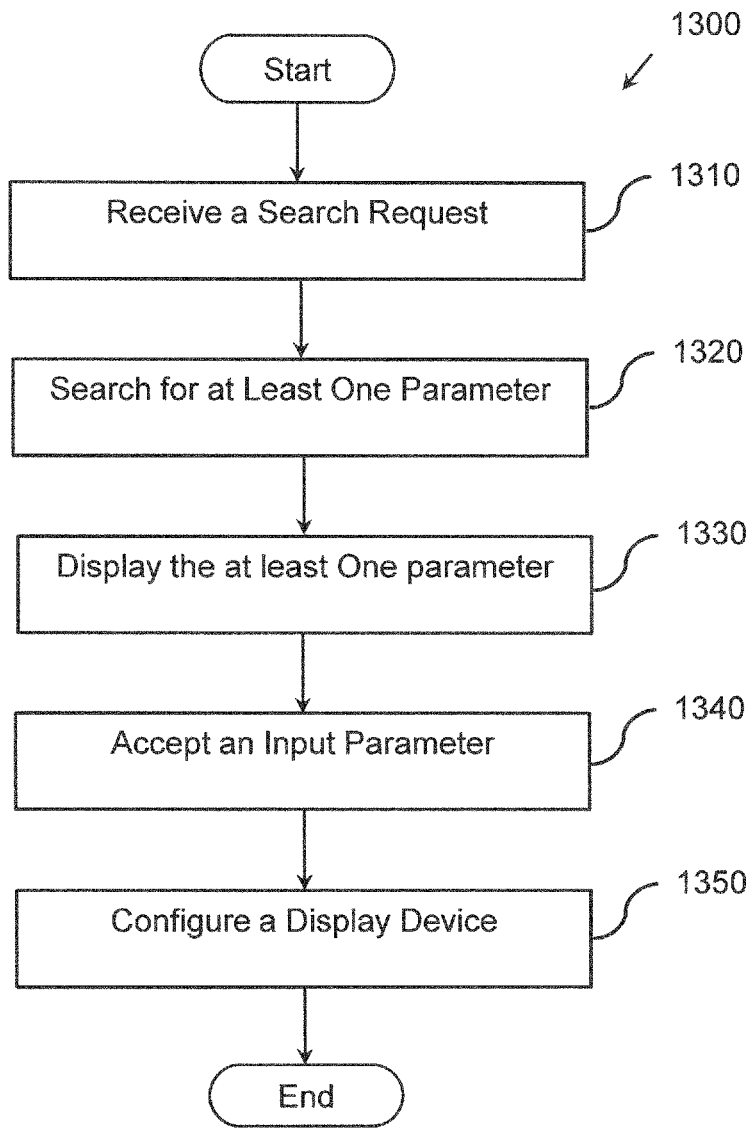
FIG. 13 illustrates one embodiment of a method associate with device configuration.

With reference to FIG. 11, one embodiment of a method 1100 is illustrated that is associated with configuring a device. The method 1100 is based on similar operations of the apparatus 100 shown in FIG. 1 but is not limited thereto. The method begins by wirelessly detecting a remote device at block 1110. In one embodiment, an image displaying device (e.g. a television) can search for wireless remote devices in its vicinity that may be capable of serving as a remote control. As previously discussed, the remote device may be a cellular device, a PDA, other hand-held processing devices that have a display and can execute a graphical user interface, and so on. The detected remote device is converted to be a remote control device for controlling the image displaying device (block 1120). Once converted, configuration settings can be received from the remote device and the image displaying device may be reconfigured based, at least in part, on the configuration settings received from the remote device (block 1130). In general, a remote device that initially is not capable of communicating with the image displaying device and/or not capable of controlling settings can be transformed to control settings on the image displaying device.

In another embodiment, the converting may comprise transmitting an interface to the remote device where the interface is configured to receive the configuration settings as input. In another embodiment, the configuration settings may initially be part of a search request to search for available settings.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method for adjusting a parameter associated with content displayed on a television, the method comprising:
    searching for a wireless device in a vicinity of the television; and
    in response to locating a wireless device in the vicinity of the television,
        sending, to the wireless device, a configuration menu to permit a user of the television to adjust a parameter associated with the content displayed on the television,
        receiving, from the wireless device, an input from the user indicating a request to adjust a parameter associated with the content displayed on the television, wherein the input from the user is captured by the wireless device through the configuration menu sent to the wireless device;
        based on the input received from the wireless device, sending, to the wireless device, a value of the parameter corresponding to the request, wherein the value of the parameter corresponding to the request is displayable on the configuration menu sent to the wireless device,
        receiving, from the wireless device, a change to the value of the parameter corresponding to the request, wherein the change to the value of the parameter corresponding to the request is captured by the wireless device through the configuration menu sent to the wireless device, and
        based on the change to the value of the parameter corresponding to the request, adjusting the content displayed on the television according to the change to the value of the parameter corresponding to the request.

2. The method of claim 1, wherein the configuration menu sent to wireless device does not block the content displayed on the television.

3. The method of claim 1, further comprising determining a skill level of the user of the television, wherein the configuration menu sent to the wireless device is configured according to the skill level determined for the user of the television.

4. The method of claim 1, the parameter corresponding to the request is a parameter associated with a device in communication with the television.

5. The method of claim 1, wherein the parameter corresponding to the request is one parameter of a plurality of related parameters that are associated with the content displayed on the television.

6. The method of claim 1, wherein the wireless device comprises a cellular phone.

7. The method of claim 1, wherein the parameter corresponding to the request comprises a contrast or a brightness of the content displayed on the television.

8. The method of claim 1, wherein the configuration menu sent to the wireless device comprises a search menu to permit the user to search for parameters that are adjustable.

9. An apparatus, comprising:
    interface logic configured to wirelessly communicate with a remote device and configured to receive, from the remote device, (i) a search input for an adjustment parameter and (ii) an input parameter value for changing the adjustment parameter;
    a search engine configured to search for the adjustment parameter in a television device based, at least in part, on the search input, wherein the adjustment parameter is a setting in the television device that controls how content is displayed by the television device;
    wherein the search engine is configured to return the adjustment parameter to the remote device after the adjustment parameter is found, and cause the remote device to display the adjustment parameter; and
    control logic configured to reconfigure the television device by changing the adjustment parameter based at least in part on the input parameter value, wherein a content is displayed on the television device based on at least the changed adjustment parameter.

10. The apparatus of claim 9, wherein the control logic is configured to control the television device to display the content based on at least a first adjustment value prior to the reconfiguring and wherein the same content is displayed on the television device based on at least the changed adjustment parameter after the television device is reconfigured.

11. The apparatus of claim 9, wherein the interface logic is configured to request that the remote device determine a user skill level, and where the search engine is configured to search for the adjustment parameter based at least in part on the user skill level.

12. The apparatus of claim 9, wherein the interface logic is further configured to establish a communication link with a second remote device to allow the search engine to search the second remote device for the adjustment parameter.

13. The apparatus of claim 9, wherein the search engine is further configured to:
    determine a list of different adjustment parameters that are related to the adjustment parameter while searching for the adjustment parameter in the television device; and
    transmit the list of different adjustment parameters to the remote device.

14. The apparatus of claim 9, wherein the interface logic is further configured to:
    wirelessly detect the remote device, wherein the remote device is a cellular telephone; and
    convert the cellular telephone to be a remote control device for controlling the television device via a user interface.

15. The apparatus of claim 9, wherein the search engine is configured to search for the adjustment parameter in the television device which does not include searching a program guide to select a show to watch or record.

16. A chip, comprising:
    an interface configured to wirelessly communicate with a remote device;
    a search engine configured to search for the adjustment parameter in a television device based, at least in part, on a search input received from the remote device, wherein the adjustment parameter is a setting in the display device that controls how content is displayed by the display device;

wherein the search does not include searching a program guide for selecting a show to watch or record;

wherein the search engine is configured to return the adjustment parameter to the remote device after the adjustment parameter is found, and cause the remote device to display the adjustment parameter; and control logic configured to reconfigure the display device by changing the adjustment parameter in the display device based at least in part on an input parameter value received from the remote device, wherein a content is displayed on the display device based on at least the changed adjustment parameter.

17. The chip of claim 16, wherein the control logic is configured to control the display device to display the content based on at least a first adjustment value prior to the reconfiguring and wherein the same content is displayed on the display device based on at least the changed adjustment parameter after the display device is reconfigured.

18. The chip of claim 16, wherein the interface logic is configured to request that the remote device determine a user skill level, and where the search engine is configured to search for the adjustment parameter based at least in part on the user skill level.

19. The chip of claim 9, wherein the search engine is further configured to:

determine a list of different adjustment parameters that are related to the adjustment parameter while searching for the adjustment parameter in the display device; and transmit the list of different adjustment parameters to the remote device.

20. The chip of claim 16, wherein the interface logic is further configured to:

wirelessly detect the remote device, wherein the remote device is a cellular telephone; and convert the cellular telephone to be a remote control device for controlling the display device by transmitting a user interface to the remote control.

21. An apparatus for adjusting a parameter associated with content displayed on a television, the apparatus comprising:

interface logic configured to:

(i) search for a wireless device in a vicinity of the television; and (ii) in response to locating the wireless device in the vicinity of the television, send, to the wireless device, a configuration menu to permit a user of the television to adjust a parameter associated with the content displayed on the television, receive, from the wireless device, an input from the user indicating a request to adjust a parameter associated with the content displayed on the television, wherein the input from the user is captured by the wireless device through the configuration menu sent to the wireless device;

based on the input received from the wireless device, send, to the wireless device, a value of the parameter corresponding to the request, wherein the value of the parameter corresponding to the request is displayable on the configuration menu sent to the wireless device, and receive, from the wireless device, a change to the value of the parameter corresponding to the request, wherein the change to the value of the parameter corresponding to the request is captured by the wireless device through the configuration menu sent to the wireless device, and control logic configured to, based on the change to the value of the parameter corresponding to the request, adjust the content displayed on the television according to the change to the value of the parameter corresponding to the request.

* * * * *